(12) United States Patent
Yasui et al.

(10) Patent No.: US 11,231,281 B2
(45) Date of Patent: Jan. 25, 2022

(54) INFORMATION-PROCESSING DEVICE, INFORMATION-PROCESSING METHOD, AND PROGRAM

(71) Applicant: HONDA MOTOR CO., LTD., Tokyo (JP)

(72) Inventors: Yuji Yasui, Wako (JP); Kentaro Ishisaka, Wako (JP); Nobuyuki Watanabe, Wako (JP); Kovi Ahego, Wako (JP); Christopher Lang, Wako (JP); Liyan Liu, Tokyo (JP); Yo Ito, Tokyo (JP); Hirotaka Uchitomi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 16/621,261

(22) PCT Filed: Jun. 11, 2018

(86) PCT No.: PCT/JP2018/022194
§ 371 (c)(1),
(2) Date: Dec. 11, 2019

(87) PCT Pub. No.: WO2018/230492
PCT Pub. Date: Dec. 20, 2018

(65) Prior Publication Data
US 2020/0116495 A1    Apr. 16, 2020

(30) Foreign Application Priority Data

Jun. 16, 2017    (JP) .............................. JP2017-118694

(51) Int. Cl.
*G01C 21/26*    (2006.01)
*H04W 4/024*    (2018.01)
(Continued)

(52) U.S. Cl.
CPC ............. *G01C 21/26* (2013.01); *B60W 30/16* (2013.01); *B60W 30/18163* (2013.01);
(Continued)

(58) Field of Classification Search
CPC ...................................................... G01C 21/26
See application file for complete search history.

(56) References Cited

U.S. PATENT DOCUMENTS 9,557,162 B2 *   1/2017   Rodriguez ............. G01B 11/14
10,332,292 B1 *   6/2019   Arnicar ................. G01C 21/00
(Continued)

FOREIGN PATENT DOCUMENTS

JP      2007-285870      11/2007
JP      2010-210405       9/2010
(Continued)

OTHER PUBLICATIONS

International Search Report and Written Opinion for International Application Serial No. PCT/JP2018/022194 dated Sep. 4, 2018, 8 pages.

*Primary Examiner* — Alex C Dunn
(74) *Attorney, Agent, or Firm* — Amin, Turocy & Watson, LLP

(57) ABSTRACT

An information-processing device of the present invention includes an acquisition unit that acquires sensor detection information indicating a detection result from a sensor mounted in a vehicle, a derivation unit that derives a plurality of indices for a surrounding environment based on the sensor detection information acquired by the acquisition unit, and an evaluation unit that evaluates attribute information of a point at which the sensor detection information is acquired based on the plurality of indices derived by the derivation unit.

14 Claims, 11 Drawing Sheets

(51) Int. Cl.
*H04W 4/48* (2018.01)
*B60W 30/16* (2020.01)
*B60W 30/18* (2012.01)
*G05D 1/00* (2006.01)
*G08G 1/0967* (2006.01)

(52) U.S. Cl.
CPC ..... *G05D 1/0088* (2013.01); *G08G 1/096725* (2013.01); *H04W 4/024* (2018.02); *H04W 4/48* (2018.02)

(56) References Cited

U.S. PATENT DOCUMENTS

| | | | |
|---|---|---|---|
| 10,948,887 B2* | 3/2021 | Gardner | ................. G16H 50/20 |
| 2008/0319640 A1 | 12/2008 | Fujita et al. | |
| 2010/0117813 A1* | 5/2010 | Lee | ........................ B60Q 9/008 |
| | | | 340/435 |
| 2010/0191433 A1* | 7/2010 | Groult | ................... G01S 15/931 |
| | | | 701/70 |
| 2016/0224850 A1* | 8/2016 | Silver | ................... G06K 9/6215 |
| 2018/0283162 A1* | 10/2018 | Bird | ................... E21B 33/0355 |
| 2019/0041845 A1* | 2/2019 | Celia | .................. G05B 19/4183 |
| 2019/0121350 A1* | 4/2019 | Celia | ....................... H04L 67/12 |
| 2019/0129409 A1* | 5/2019 | Celia | ................... H04B 17/309 |

FOREIGN PATENT DOCUMENTS

| | | |
|---|---|---|
| JP | 2012-037475 | 2/2012 |
| JP | 2017-020859 | 1/2017 |
| WO | 2005-098366 | 10/2005 |

\* cited by examiner

| VEHICLE POSITION | TRAVELING DIRECTION | CAMERA 1 | CAMERA 2 | ... | RADAR 1 | ... | VIEWFINDER 1 | ... | DATE AND TIME |
|---|---|---|---|---|---|---|---|---|---|
| (x1, y1, Z1) | | a1.x | b1.x | ... | r1.y | ... | t1.z | ... | y1/m1/h1:m1:s1 |
| (x2, y2, Z2) | | a2.x | b2.x | ... | r2.y | ... | t2.z | ... | y1/m1/h1:m2:s2 |
| (x3, y3, Z3) | | a3.x | b3.x | ... | r3.y | ... | t3.z | ... | y1/m1/h1:m3:s3 |
| ... | ... | ... | ... | ... | ... | ... | ... | ... | ... |

222

| POSITION | DISTANCE | TRANS-MITTANCE | COLOR | CONTRAST | DYNAMIC BODY | ALTITUDE |
|---|---|---|---|---|---|---|
| (x1, y1, z1) | X1 | X2 | X3 | X4 | X5 | X6 |
| ... | ... | ... | ... | ... | ... | ... |

231

| POSITION | FINAL EVALUATION VALUE | CATEGORY | SPOT NAME |
|---|---|---|---|
| (x1, y1, Z1) | ABC | MOUNTAIN | abc MOUNTAIN |
| (x3, y3, Z3) | CDE | SEA | cde BAY |
| ... | ... | ... | ... |

CONTROL ATTRIBUTE

| POSITION | COLLISION | | CONGESTION | | CURVE | | OBJECT | | ... |
| --- | --- | --- | --- | --- | --- | --- | --- | --- | --- |
| | ATTRIBUTE VALUE | ATTRIBUTE INDEX VALUE | ATTRIBUTE VALUE | ATTRIBUTE INDEX VALUE | ATTRIBUTE VALUE | ATTRIBUTE INDEX VALUE | ATTRIBUTE VALUE | ATTRIBUTE INDEX VALUE | ... |
| (x1, y1, z1) | 0 | AA | 1 | BB | 0 | CC | 1 | DD | ... |
| ... | ... | ... | ... | ... | ... | ... | ... | ... | ... |

ENVIRONMENTAL ATTRIBUTE

| POSITION | VIEW | RIDE QUALITY | CONGESTION | OUTSIDE TEMPERATURE | ... |
| --- | --- | --- | --- | --- | --- |
| (x1, y1, z1) | AAA | ABC | BBB | ABC | ... |
| ... | ... | ... | ... | ... | ... |
| (xn, yn, zn) | CCC | CCC | BBC | BCC | ... |

INFORMATION-PROCESSING DEVICE, INFORMATION-PROCESSING METHOD, AND PROGRAM

TECHNICAL FIELD

The present invention relates to an information-processing device, an information-processing method, and a program.

Priority is claimed on Japanese Patent Application No. 2017-118694, filed on Jun. 16, 2017, the contents of which are incorporated herein by reference.

BACKGROUND

Among navigation devices that provide an occupant with information relating to a route of a vehicle, a navigation device is known that provides not only information relating to a route to a destination, but also information on stores near a point at which a vehicle is traveling or sightseeing information (for example, Patent Document 1).

RELATED ART DOCUMENTS

Patent Documents

[Patent Document 1]
Japanese Unexamined Patent Application, First Publication No. 2007-285870

SUMMARY OF INVENTION

Problems to be Solved by the Invention

However, in the technique of the related art, information relating to a landscape provided to an occupant is not acquired from a vehicle traveling in reality, and it is not evaluated how good a view of a landscape in the vicinity where a vehicle is traveling is in reality.

The present invention was contrived in view of such circumstances, and one object thereof is to provide an information-processing device, an information-processing method, and a program which make it possible to automatically index how good a view of a landscape is on the basis of information acquired from a traveling vehicle.

Means for Solving the Problem

An information-processing device according to this invention has the following configurations adopted therein.

(1) An information-processing device according to an aspect of this invention is an information-processing device including: an acquisition unit that acquires sensor detection information indicating a detection result from a sensor mounted in a vehicle (for example, an information acquisition unit 210 of an embodiment); a derivation unit that derives a plurality of indices for a surrounding environment based on the sensor detection information acquired by the acquisition unit (for example, an index derivation unit 220 of the embodiment); and an evaluation unit that evaluates attribute information of a point at which the sensor detection information is acquired based on the plurality of indices derived by the derivation unit (for example, a landscape evaluation unit 230 of the embodiment).

(2) In the aspect of the above (1), the evaluation unit derives an evaluation value of a sensitivity index at the point in association with a position at which the sensor detection information is acquired based on the plurality of indices and vehicle information including position information.

(3) In the aspect of the above (2), the evaluation unit derives the evaluation value of the sensitivity index in association with a time included in a unit of a predetermined time length.

(4) In the aspect of the above (2) or (3), an information-providing unit that provides the vehicle with information relating to a landscape based on the evaluation value is further included.

(5) In the aspect of the above (4), the information-providing unit provides the vehicle with the information relating to the landscape in accordance with relevance between a category of good views selected by an occupant of the vehicle and the attribute information.

(6) In any one aspect of the above (1) to (5), the vehicle is an autonomously driven vehicle, and the vehicle performs at least one of a lane change or a change of a distance relationship with another vehicle so as to improve evaluation performed by the evaluation unit of how good a view is.

(7) An information-processing method according to an aspect of this invention is an information-processing method causing a computer to: acquire sensor detection information indicating a detection result from a sensor mounted in a vehicle; derive a plurality of indices for a surrounding environment based on the acquired sensor detection information; and evaluate attribute information of a point at which the sensor detection information is acquired based on the plurality of indices which are derived.

(8) A program according to an aspect of this invention is a program causing a computer to: acquire sensor detection information indicating a detection result from a sensor mounted in a vehicle; derive a plurality of indices for a surrounding environment based on the acquired sensor detection information; and evaluate attribute information of a point at which the sensor detection information is acquired based on the plurality of indices which are derived.

(9) In the aspect of the above (1), the derivation unit derives a plurality of indices indicating an attribute of a surrounding environment on the vehicle by inputting the sensor detection information acquired by the acquisition unit to a plurality of the evaluation units defined beforehand in accordance with a purpose used in control, and the plurality of evaluation units include a first evaluation unit that determines a control attribute reflected in control content of the vehicle using the sensor detection information and a second evaluation unit that determines an environmental attribute indicating an attribute of an environment for the point using the sensor detection information.

(10) In the aspect of the above (9), the first evaluation unit determines the control attribute more frequently than the second evaluation unit.

(11) In the aspect of the above (9), an update unit that updates a definition of the evaluation unit is further included, and the update unit is able to add the attribute information which is output from the evaluation unit.

(12) In the aspect of the above (4), a data generation unit that associates the sensor detection information and the plurality of indices with the position information, and selectively generates transmission data which is transmitted to an outside in accordance with content of the plurality of indices is further included.

(13) In the aspect of the above (12), a communication unit that receives a response signal sent back with respect to the transmission data transmitted to the outside is further included, and the information-providing unit provides land-scape information indicating information relating to a landscape around the vehicle based on any of the attribute information determined by the vehicle and updated attribute information included in the response signal.

(14) An information-processing device according to an aspect of this invention is an information-processing device including: an acquisition unit that acquires sensor detection information indicating a detection result from a sensor mounted in a vehicle through communication; a derivation unit that derives a plurality of indices for a surrounding environment of the vehicle based on the sensor detection information acquired by the acquisition unit; an evaluation unit that evaluates attribute information of a point at which the sensor detection information is acquired based on a plurality of indices derived by the derivation unit and attribute information acquired from the vehicle; and an information-providing unit that transmits a result of the evaluation evaluated by the evaluation unit to the vehicle.

Advantage of the Invention

According to (1), (7), (8), and (14), it is possible to evaluate the attribute information of the surrounding environment of the vehicle on the basis of information of a landscape around the vehicle detected by the vehicle.

According to (2), it is possible to evaluate a sensitivity index seen from the vehicle at a point where the vehicle is traveling in reality.

According to (3), it is possible to evaluate a sensitivity index changing at a time slot or in a season by evaluating the sensitivity index from the vehicle at a time when the vehicle is traveling in reality.

According to (4), information of the evaluated sensitivity index is provided to the vehicle, and thus an occupant can drive by selecting a route according to the sensitivity index.

According to (5), an occupant can drive by selecting a category of a landscape with a good view and selecting a route with a good view corresponding to the category.

According to (6), an autonomously driven vehicle can travel with a good view by changing a lane of a host vehicle or a positional relationship with another vehicle.

According to (9), the vehicle can use the derived plurality of indices in traveling control of the vehicle or information provision of a route.

According to (10), the vehicle can control traveling assistance of the vehicle by determining an attribute relevant to traveling control at a high frequency.

According to (11), it is possible to obtain an evaluation result by setting an attribute desired to be inspected by a user.

According to (12), the transmission data is not generated in a case where there is no calculated attribute value or a case where a condition is not satisfied, and thus it is possible to improve communication efficiency.

According to (13), it is possible to use attribute information updated by an external server in addition to attribute information determined by the vehicle, and to perform assistance of traveling control of the vehicle more reliably.

BRIEF DESCRIPTION OF THE DRAWINGS

FIG. 4 is a diagram illustrating an example of content of detection data 115 which is generated by an object recognition device 114 according to the embodiment.

FIG. 15 is a diagram illustrating an example of content of data which is included in control attributes.

FIG. 16 is a diagram illustrating an example of content of data which is included in environmental attributes.

DESCRIPTION OF THE EMBODIMENTS

Hereinafter, an embodiment of an information-processing device, an information-processing method, and a program of the present invention will be described with reference to the accompanying drawings.

Figure 1:
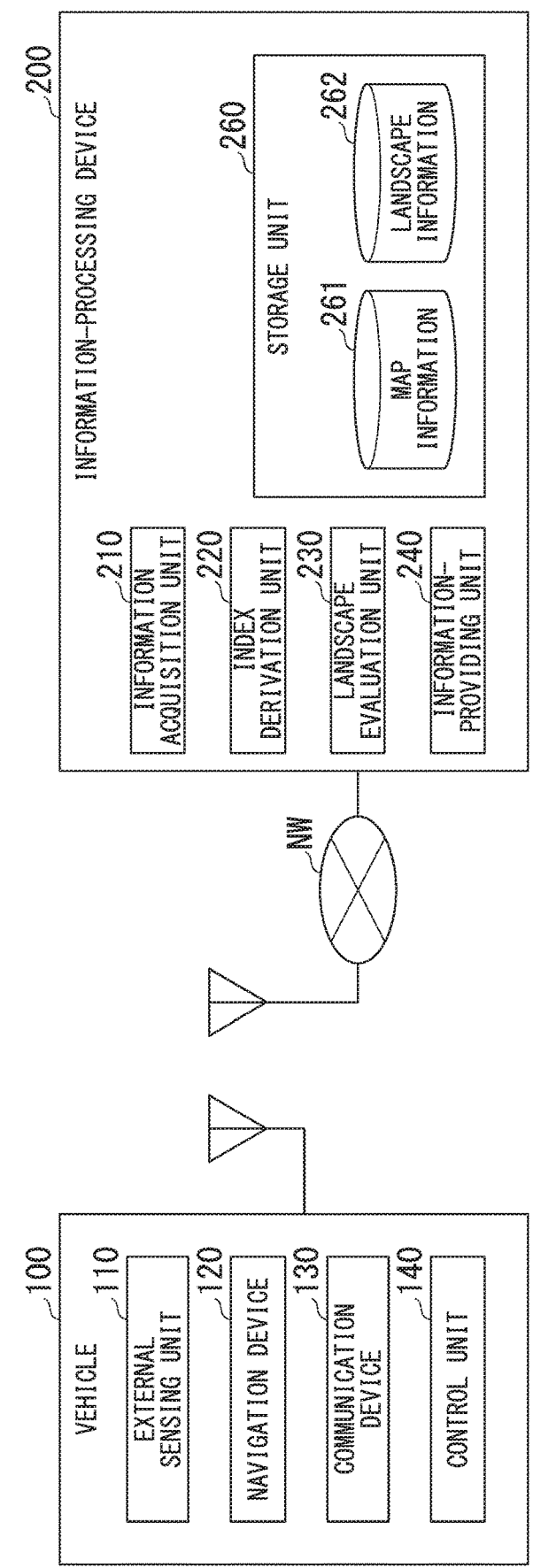
FIG. 1 is a diagram illustrating an example of a configuration of an information-processing system 1 according to an embodiment.

FIG. 1 is a diagram illustrating an example of a configuration of an information-processing system 1 according to the embodiment. The information-processing system 1 includes, for example, a vehicle 100 and an information-processing device 200. The vehicle 100 performs wireless communication, and communicates with the information-processing device 200 through a network NW. The information-processing device 200 acquires a detection result based on a sensor mounted in the vehicle 100, and evaluates how good a view of a point where the vehicle 100 has traveled is.

[Vehicle]

The vehicle 100 includes, for example, an external sensing unit 110, a navigation device 120, a communication device 130, and a control unit 140. The external sensing unit 110 acquires outside information using a sensor, mounted in the vehicle 100, which senses the outside.

Figure 2:
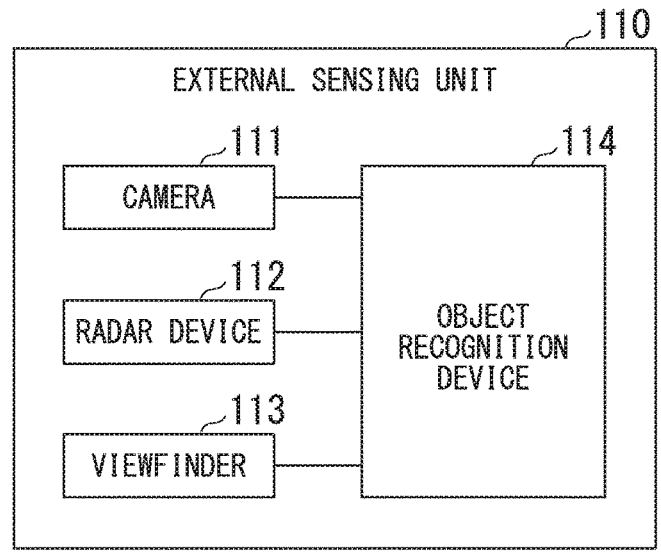
FIG. 2 is a diagram illustrating an example of a configuration of an external sensing unit 110 according to the embodiment.

FIG. 2 is a diagram illustrating an example of a configuration of the external sensing unit 110. The external sensing unit 110 includes a camera 111, a radar device 112, a viewfinder 113, and an object recognition device 114 as sensors. These sensors are also used as, for example, outside monitoring sensors for autonomous driving.

The camera 111 is a digital camera using a solid-state imaging element such as, for example, a charge-coupled device (CCD) or a complementary metal-oxide-semiconductor (CMOS). The camera 111 captures images of the vicinity of the vehicle 100. One or a plurality of cameras 111 are installed at any points on the vehicle 100, and capture images of the vicinity of the vehicle 100. In a case where a forward image is captured, the camera 111 is installed on the upper portion of the front windshield, the rear surface of the rear-view mirror, or the like.

In addition, in a case where a rearward image is captured, the camera 111 is installed, for example, in the vicinity of the rear bumper. In a case where a crosswise image is captured, the camera 111 is installed at, for example, right and left side mirrors. The camera 111 may be, for example, a stereo camera, installed at the roof of the vehicle 100, which captures an image of a landscape around 360°. The camera 111 captures an image of the vicinity of the vehicle 100, for example, periodically repeatedly.

The radar device 112 radiates radio waves such as millimeter waves to the vicinity of the vehicle 100, and detects radio waves (reflected waves) reflected from an object to detect at least the position (distance to and orientation of) of the object. One or a plurality of radar devices 112 are installed at any points of the vehicle 100. The radar device 112 may detect the position and speed of an object with a frequency-modulated continuous-wave (FMCW) system. In addition, a distance camera that measures a distance may be used in the measurement of a distance.

The viewfinder 113 is a light detection and ranging or laser imaging detection and ranging (LIDAR) finder that measures scattered light with respect to irradiation light and detects a distance to an object. One or a plurality of viewfinders 113 are installed at any points on the vehicle 100.

Figure 3:
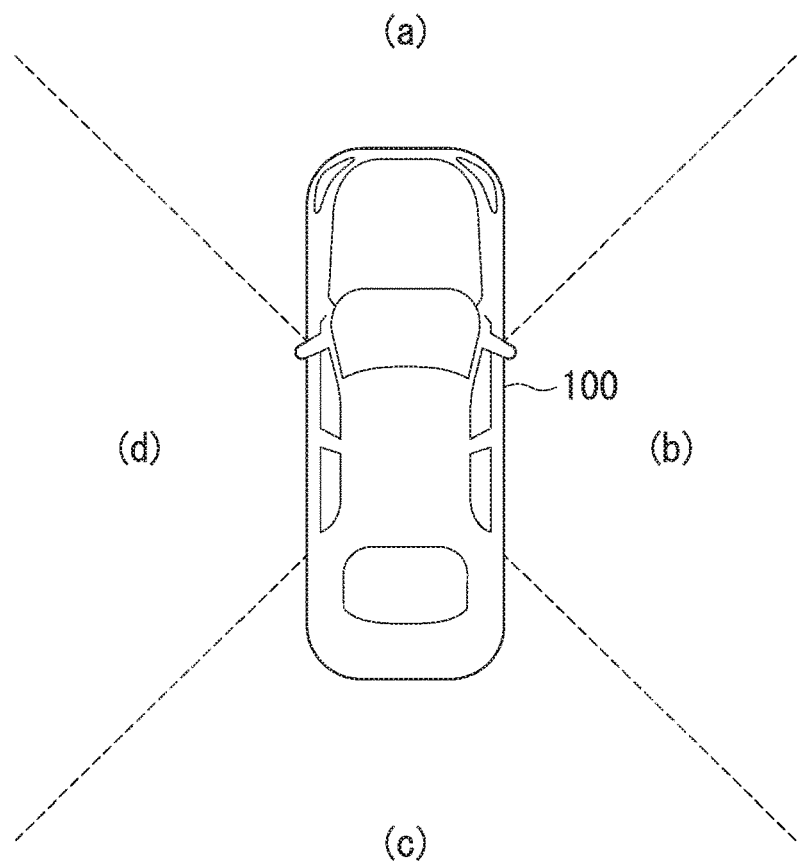
FIG. 3 is a diagram illustrating regions around a vehicle 100 which are detected by each sensor according to the embodiment.

FIG. 3 is a diagram illustrating regions around the vehicle 100 which are detected by each sensor. Here, (a) shows a detection region of a sensor that detects the front, (b) shows a detection region of a sensor that detects the right side, (c) shows a detection region of a sensor that detects the rear, and (d) shows a detection region of a sensor that detects the left side. Forward, rearward, rightward, and leftward directions of the vehicle 100 can be sensed by each sensor of the camera 111, the radar device 112, and the viewfinder 113 which are mounted in the vehicle 100.

The object recognition device 114 recognizes the position, type, speed, or the like of an object outside of the vehicle 100 by performing a sensor fusion process on detection results based on some or all of the camera 111, the radar device 112, and the viewfinder 113. The object recognition device 114 recognizes states such as the position, speed, and acceleration of a nearby object or a structure, and recognizes an object or the like around the vehicle 100 which is recognized. The position of a nearby object may be represented by a representative point such as the centroid or a corner of the object, or may be represented by a region which is represented by the contour of the object. Examples of objects recognized by the object recognition device 114 include a structure, a building, trees, a guardrail, a telephone pole, a parked vehicle, a pedestrian, other objects, and the like in addition to the nearby vehicle. Such a function is used when a nearby object of the vehicle 100 is recognized in autonomous driving.

The object recognition device 114 generates data detected by each sensor as detection data 115 together at a predetermined timing. The object recognition device 114 generates the detection data 115 sampled at a predetermined sampling interval. FIG. 4 is a diagram illustrating an example of content of the detection data 115 which is generated by the object recognition device 114. The detection data 115 includes, for example, a vehicle position, a traveling direction, a detection result of each sensor, a date and time, and the like. The detection data 115 is an example of sensor detection information indicating the detection result of the external sensing unit 110.

The vehicle position is data indicating a position where an image or the like is acquired. The object recognition device 114 acquires position data for each sampling period from the navigation device 120, and sets the acquired position data as a vehicle position. The traveling direction data is data in which the traveling direction of the vehicle 100 is recorded. The object recognition device 114 acquires the traveling direction data from a change of the position data or the like.

A camera 1, a camera 2, . . . include image data captured in a plurality of directions in the vicinity of the vehicle 100. A radar 1, . . . include data of results in which the radar device 112 has detected an object in a plurality of directions in the vicinity of the vehicle 100. A viewfinder 1, . . . include data in which the viewfinder 113 has detected an object in a plurality of directions in the vicinity of the vehicle 100. The date and time data is information of a date and time at which an image, a detection result or the like is acquired.

Figure 5:
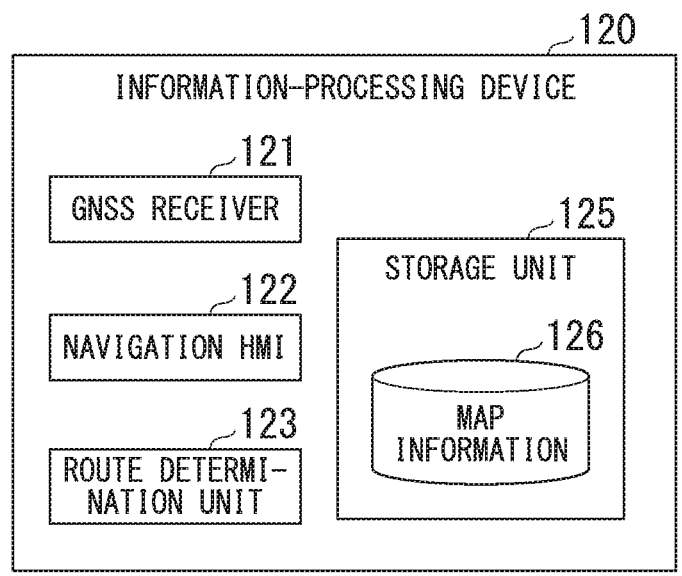
FIG. 5 is a diagram illustrating an example of a configuration of a navigation device 120 according to the embodiment.

FIG. 5 is a diagram illustrating an example of a configuration of the navigation device 120. The navigation device 120 performs route guidance in accordance with a route along which the vehicle 100 travels to a destination. The navigation device 120 includes, for example, a global navigation satellite system (GNSS) receiver 121, a navigation HMI 122, and a route determination unit 123, and holds map information 126 in a storage unit 125 such as a hard disk drive (HDD) or a flash memory.

The GNSS receiver 121 specifies the position (latitude, longitude, or altitude) of the vehicle 100 on the basis of a signal received from a GNSS satellite. The position of the vehicle 100 may be specified or complemented by an inertial navigation system (INS) in which an output of a vehicle sensor 60 is used. The navigation device 120 generates the position data or the traveling direction data of the vehicle 100 on the basis of received data of the GNSS receiver 121.

The navigation HMI 122 includes a display device, a speaker, a touch panel, a key, and the like. The navigation HMI 122 may be partly or wholly shared with the above-described HMI 110. The route determination unit 123 refers to the map information 126 to determine a route to a destination (including, for example, information relating to a transit point during traveling to a destination) input by an occupant using the navigation HMI 122, for example, from the position of the vehicle 100 specified by the GNSS receiver 121 (or any input position).

The map information 126 is, for example, information in which a road shape is represented by a link indicating a road and nodes connected by the link. The map information 126 may include the curvature of a road, point of interest (POI) information, or the like. As described later, the POI includes information of a place with a good view which is acquired from the information-processing device 200.

The map information 126 may be updated at any time by accessing the information-processing device 200 through the communication device 130 and the network NW. The map information 126 may have information relating to a net user's POI acquired through the network NW further added thereto. The POI in a route during traveling may be displayed on the navigation HMI 122.

The navigation device 120 performs route guidance using the navigation HMI 122 on the basis of a route determined by the route determination unit 123. Meanwhile, the navigation device 120 may be realized by the function of a terminal device such as, for example, a smartphone or a tablet terminal possessed by a user. In addition, the navigation device 120 may transmit its current position and destination to the information-processing device 200 or other navigation servers (not shown) through the communication device 130, and acquire a route sent back from them.

The communication device 130 performs wireless communication, for example, using a cellular network, a Wi-Fi network, Bluetooth (registered trademark), dedicated short-range communication (DSRC), or the like, and communicates with the information-processing device 200 through the network NW.

The control unit 140 transmits the detection data 115 indicating the detection result detected by the external sensing unit 110 to the information-processing device 200 through the communication device 130 and the network NW. In addition, the control unit 140 causes the navigation HMI 122 to display information transmitted by the information-processing device 200 through the communication device 130.

The control unit 140 is realized by a processor such as a central processing unit (CPU) executing a program (software). In addition, some or all of the control unit 140, the external sensing unit 110, and the navigation device 120 may be realized by hardware such as a large-scale integration (LSI), and application-specific integrated circuit (ASIC), or field-programmable gate array (FPGA), or may be realized by software and hardware in cooperation.

[Information-Processing Device]

As shown in FIG. 1, the information-processing device 200 includes, for example, an information acquisition unit 210, an index derivation unit 220, a landscape evaluation unit 230, an information-providing unit 240, and a storage unit 260.

The index derivation unit 220, the landscape evaluation unit 230, and the information-providing unit 240 are realized by a processor such as a central processing unit (CPU) executing a program (software). In addition, some or all of these functional units may be realized by hardware such as a large-scale integration (LSI), an application-specific integrated circuit (ASIC), or a field-programmable gate array (FPGA), or may be realized by software and hardware in cooperation. The program may be stored in a storage device such as a hard disk drive (HDD) or a flash memory in advance, may be stored in a detachable storage medium such as a DVD or a CD-ROM, or may be installed in the storage device by the storage medium being mounted in a drive device (not shown).

The information acquisition unit 210 includes, for example, a network interface card (NIC) for connection to the network NW. The information acquisition unit 210 acquires the detection data 115 from the external sensing unit 110 mounted in the vehicle through the network NW.

The index derivation unit 220 derives a plurality of indices indicating how good a view of a landscape around the vehicle 100 is on the basis of the detection data 115 acquired by the information acquisition unit 210. The index derivation unit 220 derives a plurality of indices by performing an image analysis, an arithmetic operation or the like on the basis of the detection data 115. A method of deriving a plurality of indices will be described later in detail.

The landscape evaluation unit 230 evaluates how good a view of a point at which the detection data 115 is acquired is on the basis of the plurality of indices derived by the index derivation unit 220. A method of evaluating how good a view is will be described later in detail.

In addition, the information-providing unit 240 transmits information on how good a view evaluated by the landscape evaluation unit 230 is to the vehicle 100 through the network NW. In a case where the information-processing device 200 is a navigation server, the information on how good a view evaluated by the landscape evaluation unit 230 is may be reflected in a route search result.

The storage unit 260 is realized by, for example, a random-access memory (RAM), a read-only memory (ROM), a hard disk drive (HDD), a flash memory, a hybrid-type storage device in which a plurality of elements among them are combined, or the like. In addition, a portion or the entirety of the storage unit 260 may be an external device, such as a network-attached storage (NAS) or an external storage server, to which the information-processing device 200 is able to have access. The storage unit 260 has, for example, map information 261 and landscape information 262 stored therein.

The map information 261 is, for example, information in which a road shape is represented by a link indicating a road and nodes connected by the link. The map information 261 includes the curvature of a road, POI information, or the like.

The landscape information 262 has information relating to how good a view evaluated by the landscape evaluation unit 230 is stored therein. The information relating to how good a view is stored in association with, for example, a plurality of coordinates (positions) where nodes or links stored in the map information 261 are present. The POI may be associated with the coordinates.

[Information Generation Method]

Next, a method of generating information relating to how good a view is in the information-processing device 200 will be described. The index derivation unit 220 refers to the detection data 115 acquired by the information acquisition unit 210, and derives multiple types of index values X1 to Xn (n is any natural number) relating to how good a view is in association with positions.

The index derivation unit 220 derives, as an index value Xn, a statistical value such as an average of indices according to direction or a maximum value which is obtained in forward, rearward, rightward, and leftward directions in the vicinity of the vehicle 100 on the basis of data of each of a plurality of sensors. The index derivation unit 220 may derive the index value Xn according to direction. The derivation of the index value Xn according to direction is, for example, the derivation of the index value Xn for each direction such as a forward direction from a driver's seat and a passenger seat, a direction outward from the side window, or a rearward direction from the rear window.

The index derivation unit 220 derives an index value relating to, for example, distance, transmittance, color, contrast, dynamics, altitude or the like as an index indicating how good a view is.

Regarding the distance, the index derivation unit 220 derives an index using distance data of the radar device 112 recorded in the detection data 115. The index derivation unit 220 may use distance data obtained by the external sensing unit 110 in the calculation of distance, or calculate a distance corresponding to a pixel from a focal length or a difference in a change of image data based on a plurality of pieces of image data.

Figure 6:
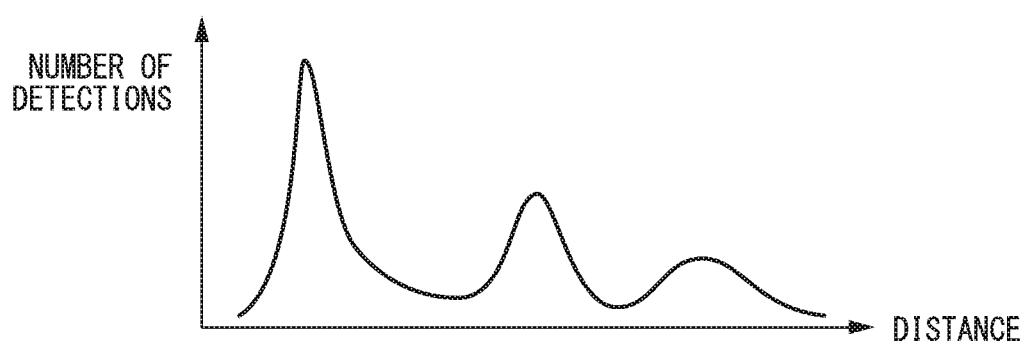
FIG. 6 is a histogram illustrating a distribution of distances according to the embodiment.

In a case where the index of distance is derived, the index derivation unit 220 calculates a distribution of distances detected in the forward, rearward, rightward, and leftward directions of the vehicle 100 on the basis of the distance data. For example, when 360 degrees in the vicinity of a vehicle is surveyed, a distance is obtained for every horizontal angle, and a distribution of distances is calculated. This distribution is represented in the form of a histogram. FIG. 6 is a histogram illustrating a distribution of distances. The index derivation unit 220 derives an index value indicating the extent of a distribution of distances, for example, using a variance value of a distribution of distances as a parameter.

In a case where the index of transmittance is derived, the index derivation unit 220 calculates a contrast index (a frequency component) of a pixel a predetermined distance or more away in an image. In the pixel a predetermined distance or more away, a portion obtained by imaging a predetermined distance or more among images (which may not be stereo images) using, for example, a stereo camera is extracted. The index derivation unit 220 performs a two-dimensional FFT process perpendicular to a horizontal direction with respect to an image of the extracted portion, and calculates a spatial frequency spectrum. The index derivation unit 220 uses the calculated spatial frequency spectrum as a contrast index of transmittance. A high-frequency component of a landscape portion of a predetermined range or more indicates a high transmittance.

In a case where the contrast index is derived, the index derivation unit 220 performs a two-dimensional FFT process similarly to the above with respect to an image, calculates a spatial frequency spectrum, and uses the spatial frequency spectrum as the contrast index of texture in the image. In a case where the contrast index of texture in an image is high, a place where the image is captured is likely to be, for example, a landscape having a high proportion of texture of a forest, a bare rock or the like.

Figure 7:
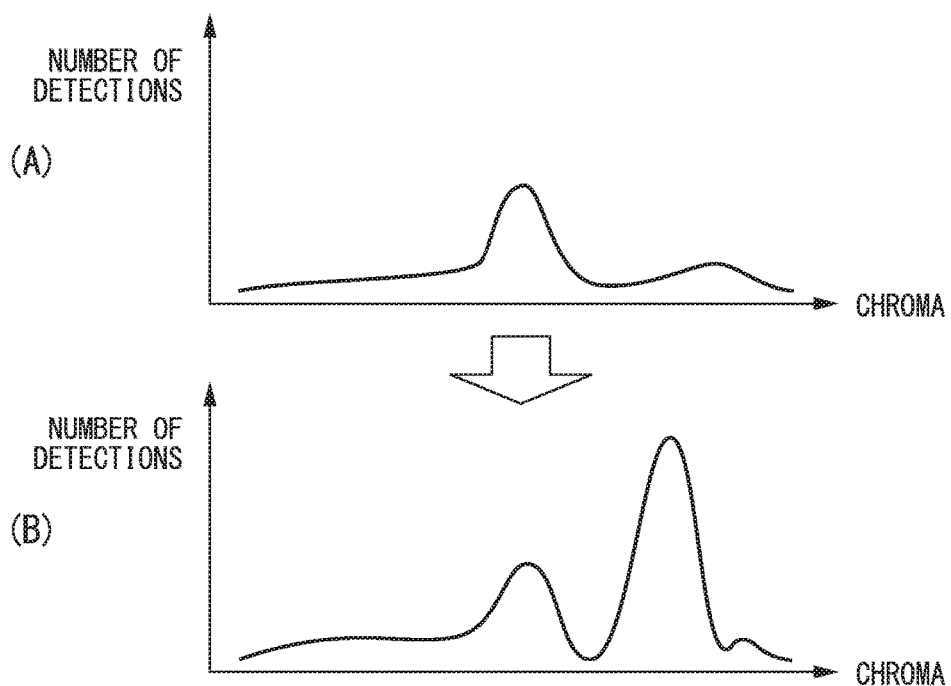
FIG. 7 is a histogram illustrating a distribution of chroma according to the embodiment.

In a case where the color index of hue and chroma is derived, the index derivation unit 220 calculates the hue and chroma of each pixel in an image. The index derivation unit 220 divides, for example, an image into a plurality of regions, and calculates a distribution of hue and chroma for each region. This distribution is represented in the form of a histogram. FIG. 7 is a histogram illustrating a distribution of chroma. The index derivation unit 220 uses the distribution of hue and chroma as a color index in an image.

The index derivation unit 220 compares the distributions of hue and chroma in the respective regions, and extracts a place where an image is captured as a spot characterized by hue in a case where a significantly different characteristic distribution is obtained in surrounding regions. The height of an index value of color serves as an index in which a distribution of colors is characteristic with respect to the surroundings. A region having a distribution characteristic with respect to surrounding regions in an image is likely to be, for example, a landscape characterized by the hue of a flower, the sea or the like.

In a case where an index relating to dynamics is derived, the index derivation unit 220 derives an index using a plurality of pieces of position data and a plurality of pieces of image data. In a case where a subject is moving, an index relating to dynamics is derived on the basis of the amount of movement in an image of the subject.

The index derivation unit 220 calculates the movement (dynamics) of a subject from a difference in a change of image data on the basis of a plurality of images and movement data of the vehicle 100.

Figure 8:
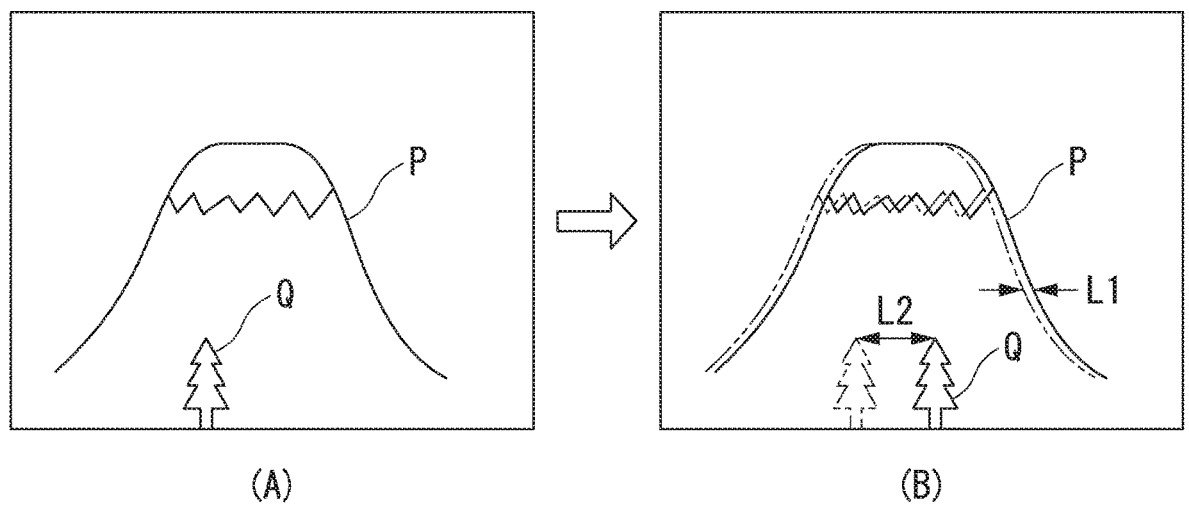
FIG. 8 is a diagram illustrating a movement of a subject in continuously captured images according to the embodiment.

FIG. 8 is a diagram illustrating a movement of a subject in continuously captured images. For example, in a case where an image is captured in (B) a predetermined time after an image captured in (A), a movement distance L1 of a large subject P which is distant in (B) is smaller than a movement distance L2 of a subject Q located at a short distance. In a case where a region of the subject is large and a small movement is detected with respect to a movement distance L of the vehicle 100, the index derivation unit 220 may derive an index value using this movement as an index of dynamics.

The index derivation unit 220 extracts, for example, a subject having a size of a predetermined value or more on the basis of continuously captured images. The index derivation unit 220 extracts, for example, the subject P on the basis of the image of (A) and the image of (B). For example, in a case where a ratio between an area S1 in the image of the subject P and an area S of the image (S1/S) exceeds a predetermined threshold, the index derivation unit 220 recognizes that the subject P is a large subject.

The index derivation unit 220 calculates an index of movement of the subject P on the basis of the image of (A) and the image of (B). The index of movement of the subject P is calculated on the basis of, for example, a correlation between the movement distance L1 of the subject P in the image of (A) and the image of (B) and the movement distance L of the vehicle while the image of (A) and the image of (B) are captured. A case where a subject region is large in the index value of movement and the movement distance L1 of the subject is smaller than the movement distance L of the vehicle 100 serves as an index indicating that a distant landscape is imaged. The index value of dynamics serves as an index of a scene in which a large subject such as a mountain, a tree, or a building comes into sight.

In a case where an index relating to altitude is derived, the index derivation unit 220 uses three-dimensional position data of the navigation device 120 which is recorded in the detection data 115. The index derivation unit 220 extracts a place having an altitude of a predetermined threshold or more. The index value of altitude serves as an index of a scene in which the field of vision capable of being surveyed extends.

Figures 9, 10, 11:
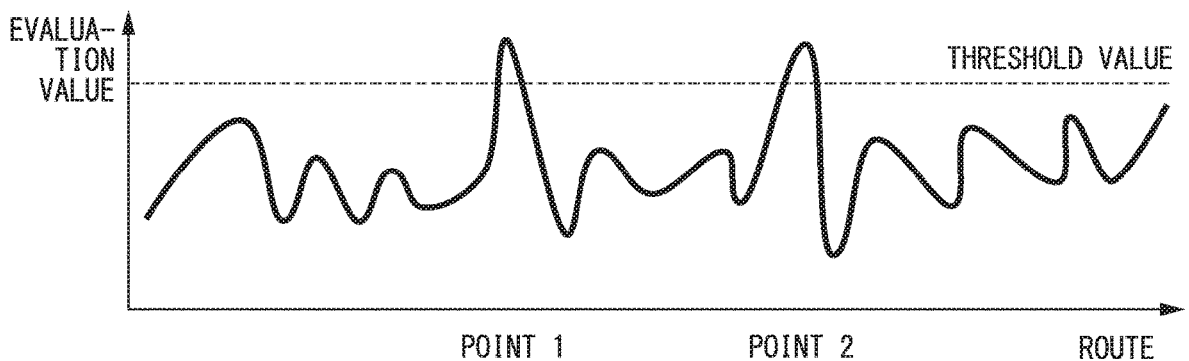
FIG. 9 is a diagram illustrating an example of content of derived index value data 222 according to the embodiment.
FIG. 10 is a diagram illustrating an example of content of POI data of a place with a good view according to the embodiment.
FIG. 11 is a graph illustrating an example of a relationship between travel data of the vehicle 100 and a final evaluation value according to the embodiment.

FIG. 9 is a diagram illustrating an example of content of derived index value data 222. The landscape evaluation unit 230 evaluates how good a view of a point at which the detection data 115 is acquired is on the basis of a plurality of index values X1 to Xn derived by the index derivation unit 220.

The landscape evaluation unit 230 extracts a distance of a predetermined value or more on the basis of the index value of distance. A place of which the index value of distance is a predetermined value or more indicates that its space spreads, and a high relevance to a view is estimated. The landscape evaluation unit 230 groups a plurality of index values X1 to Xn derived in the extracted place by combining the index value Xn having relevance. A group is determined for each category of, for example, a landscape such as "mountain" or "seashore."

The landscape evaluation unit 230 multiplies each grouped index value Xn by a weighting coefficient an. The landscape evaluation unit 230 adds the index value Xn of a group by increasing a coefficient an of each index value Xn within a group in accordance with the synergistic effect of a group, and calculates a score (an evaluation value) for each group as represented by Expression (1).

$$\text{Group evaluation value}(1) = \quad (1)$$
$$(\alpha 1 \cdot X1 + \alpha 2 \cdot X2 + \alpha 3 \cdot X3) \text{ group evaluation value}(2) =$$
$$(\alpha 4 \cdot X4 + \alpha 5 \cdot X5), \ldots$$

The synergistic effect of a group refers to the addition of a weight to a coefficient an of an index value Xn having relevance to a place having a good view. For example, a weight is added to a coefficient an of an index value such as, for example, color or transmittance in a case where a landscape is "sea," and a weight is added to a coefficient of an index value such as, for example, distance, color, dynamics, or altitude in a case where a landscape is "mountain." The landscape evaluation unit 230 compares scores for each group, performs ranking, and selects a group having a highest score as a final evaluation value on the basis of Expression (2). The group having the highest score indicates a representative landscape of a point at which the detection data 115 is acquired.

$$\text{Final evaluation value} = \text{MAX}\{(\alpha 1 \cdot X1 + \alpha 2 \cdot X2 + \alpha 3 \cdot X3), (\alpha 4 \cdot X4 + \alpha 5 \cdot X5), \ldots\} \quad (2)$$

The landscape evaluation unit 230 adds a weight to a coefficient an in association with a season in which the detection data 115 is acquired on the basis of the detection data 115 acquired during a predetermined period, and thus a scene characteristic of a season may be selected. For example, the landscape evaluation unit 230 can increase weights of coefficients of distance, transmittance, color, and contrast in the seasons of spring and autumn, and select a place with a good view which is characterized by the hue of a landscape of autumn leaves, cherry blossoms or the like.

The landscape evaluation unit 230 may evaluate how good a view is by adding a weight to a coefficient an in association with a position and time at which the detection data 115 is acquired. For example, a landscape may change depending on a time slot such as sunrise or sunset even in the same place. In a time slot such as sunrise or sunset, a characteristic landscape having an increase in a tint of red chromaticity in an image appears. The landscape evaluation unit 230 may add, for example, a weight to a coefficient an of the index value Xn of color in association with a time. Thereby, the landscape evaluation unit 230 can select, for example, a place with a good view at a time at which the hue is characteristic, such as a time of sunset or sunrise on a lakeside or seashore.

In a case where the index derivation unit 220 derives the index value Xn in each detection direction of each sensor, the landscape evaluation unit 230 may evaluate how good a view is by adding a weight to a coefficient an in association with a position at which the detection data 115 is acquired and the movement direction thereof. For example, in a case where the spread of a scene having a good view in a direction in which the vehicle 100 moves is desired to be evaluated, the landscape evaluation unit 230 may add a larger weight to a coefficient an of the index value Xn in a traveling direction than in other directions.

The landscape evaluation unit 230 may rank how good a view is on the basis of the score of a group, and store information relating to how good a view is for each category, as the landscape information 262, in the storage unit 260.

The categories are categories such as, for example, "best views," "colorful spots," "landmark tour spots," "mountains," "seas," or "night views."

The landscape evaluation unit 230 may impart a spot name to the extracted place with a good view with reference to the map information 261. The landscape evaluation unit 230 may impart a spot name to a place with a good view on the basis of information retrieved through the network NW. The landscape evaluation unit 230 generates information relating to how good a view is as POI data, and adds the generated information to the map information 261. The network NW includes some or all of, for example, a wide area network (WAN), a local area network (LAN), the Internet, a dedicated channel, a wireless base station, a provider, and the like.

FIG. 10 is a diagram illustrating an example of content of POI data 231 of a place with a good view.

Further, the landscape evaluation unit 230 may generate data by associating travel data of the vehicle 100 with a final evaluation value. FIG. 11 is a graph illustrating an example of a relationship between travel data of the vehicle 100 and a final evaluation value. The landscape evaluation unit 230 associates the travel data with the final evaluation value, and extracts a point at which the final evaluation value exceeds a predetermined threshold as a place with a good view. The landscape evaluation unit 230 may add data of a place with a good view on an extracted travel route to the map information 261.

In the information-processing system 1, the evaluation of how good a view is may be performed on the basis of information sensed by a plurality of vehicles 100. In this case, the POIs of the landscape information 262 and the map information 261 which are stored in the storage unit 260 may be updated in real time by performing statistical processing on the information sensed by the plurality of vehicles 100.

The information-providing unit 240 provides the vehicle 100 with the POI information on how good a view is which is stored in the map information 261. For example, in a case where an occupant performs an operation of setting of a route to a destination in the navigation device 120 by the information-providing unit 240 providing information to the vehicle 100, information on a place with a good view is provided corresponding to the route to a destination. Thereby, in the navigation HMI 122, a spot having a good view is displayed on the route to a destination.

The information-providing unit 240 may select a place having a good view in accordance with a category of good views which is selected by an occupant of the vehicle 100 and provide the vehicle 100 with the selected place. In addition, the navigation device 120 may perform route setting in accordance with the category of good views which is selected by the occupant. When the occupant performs, for example, an operation on the navigation HMI 122, the occupant selects a category such as "best views," "colorful spots," or "landmark tour spots." In a case where the occupant selects, for example, a category of "best views," the navigation device 120 performs route setting in accordance with the "best views," and thus the occupant can drive along a route with a good view.

Figure 12:
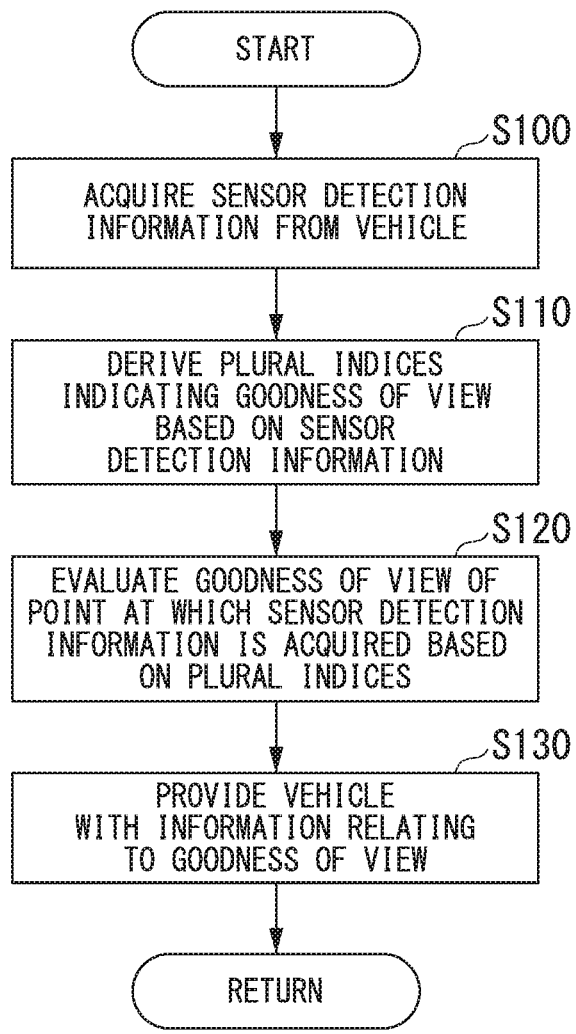
FIG. 12 is a flow chart illustrating an example of a flow of processes which are executed in the information-processing system 1 according to the embodiment.

Next, processes which are executed in the information-processing system 1 will be described. FIG. 12 is a flow chart illustrating an example of a flow of processes which are executed in the information-processing system 1. First, the information acquisition unit 210 acquires the detection data 115 from the vehicle 100 through the network NW (step S100). The index derivation unit 220 derives a plurality of index values Xn indicating how good a view is on the basis of the detection data 115 (step S110).

The landscape evaluation unit 230 evaluates how good a view of a point at which sensor detection information is acquired is on the basis of the plurality of index values Xn (step S120). The information-providing unit provides the vehicle 100 with information relating to how good a view is (step S130).

As described above, according to the information-processing system 1, it is possible to automatically index how good a view is on the basis of the detection data 115 from the vicinity of the vehicle 100 which is detected by the vehicle 100.

Thereby, according to the information-processing system 1, it is possible to evaluate how good a view at a point at which the detection data 115 is acquired is in accordance with a position and time at which the detection data 115 is acquired.

In addition, according to the information-processing system 1, an occupant can perform route setting in the navigation device 120 in accordance with a category of good views, and the occupant can drive along a route with a good view.

Figure 13:
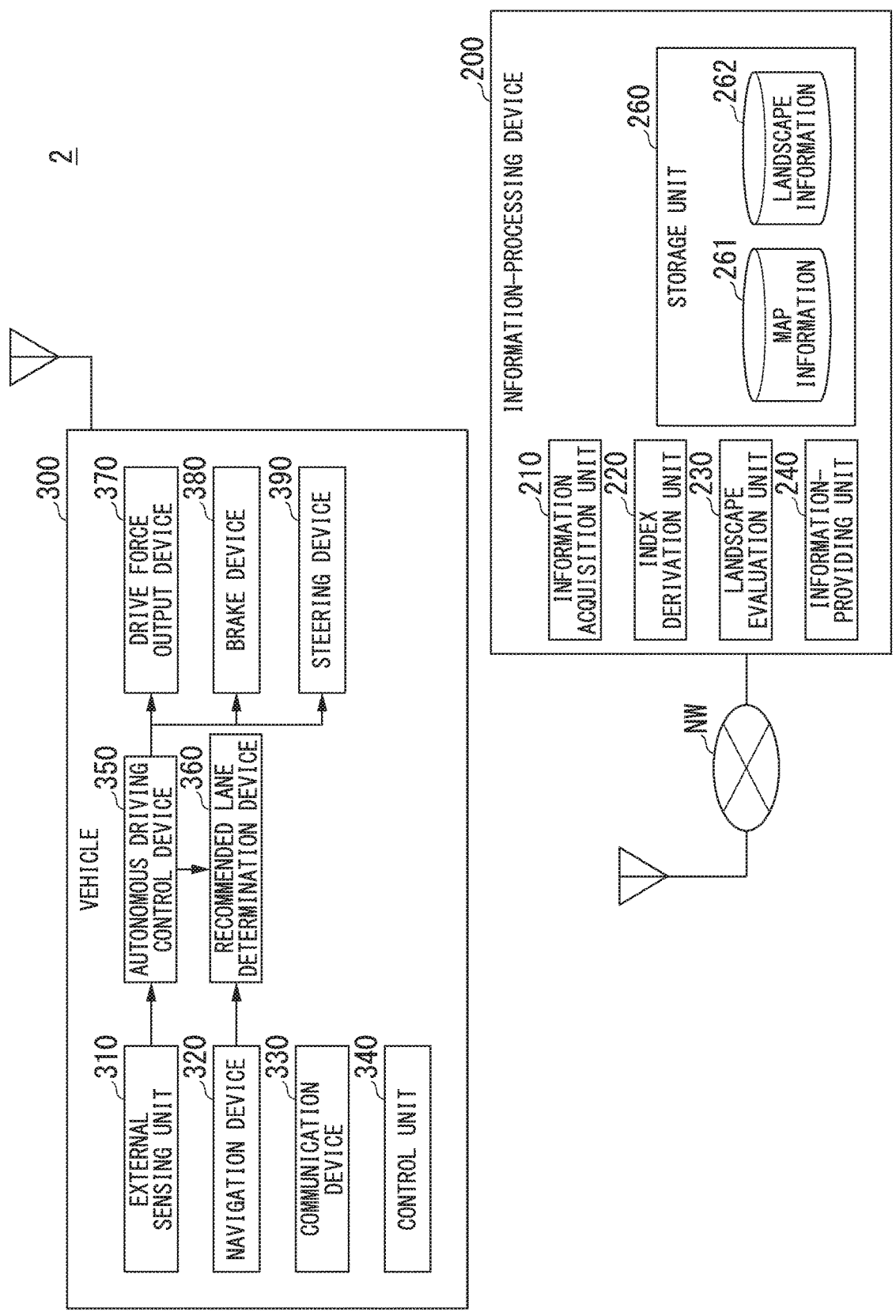
FIG. 13 is a configuration diagram in a case where an autonomously driven vehicle 300 is applied to an information-processing system 2 according to the embodiment.

The above-described information-processing system 1 may be applied to an autonomously driven vehicle 300. FIG. 13 is a configuration diagram in a case where the autonomously driven vehicle 300 is applied to an information-processing system 2. A navigation device 320 outputs a route to a destination to a recommended lane determination device 360. The recommended lane determination device 360 refers to a map which is more detailed than map data included in the navigation device 320, determines a recommended lane in which a vehicle travels, and outputs the recommended lane to an autonomous driving control device 350.

The autonomous driving control device 350 controls some or all of a drive force output device 370 including an engine or a motor, a brake device 380, and a steering device 390 so as to travel along the recommended lane which is input from the recommended lane determination device 360 on the basis of information which is input from an external sensing unit 310.

Here, the autonomously driven vehicle 300 may change the recommended lane on the basis of evaluation performed by the landscape evaluation unit 230. The autonomously driven vehicle 300 performs at least one of a lane change or a change of a distance relationship with another vehicle so as to improve the evaluation performed by the landscape evaluation unit 230 of how good a view is. For example, the recommended lane determination device 360 may determine a recommended lane to which to perform a lane change or to return to an original lane after the lane change so that the index from the landscape evaluation unit 230 of how good a view is improves. In addition, in a case where a parallel traveling vehicle or a nearby vehicle is present, the recommended lane determination device 360 may determine a recommended lane so as to change a route, such as increasing an inter-vehicle distance, performing a lane change, or passing so that the index from the landscape evaluation unit 230 of how good a view is improves.

In such an autonomously driven vehicle 300, it is assumed that there are more opportunities for an occupant to view the landscape than in a manually driven vehicle. Therefore, by using the information-processing system 2 according to the embodiment, an occupant can select a route to a destination with a good view along a route in which autonomous driving is being performed.

Modification Example

In the above embodiment, a case where the autonomously driven vehicle 300 communicates with the information-processing device 200 and derives an index value of how good a view is along a travel route of the vehicle has been illustrated. An index value for the surrounding environment of the autonomously driven vehicle 300 may be derived on the autonomously driven vehicle 300 side rather than being derived in the information-processing device 200 provided outside of the autonomously driven vehicle 300. The index value for the surrounding environment of the autonomously driven vehicle 300 may be derived in accordance with the position of the vehicle. In the following description, the same components as those in the above embodiment (the number of devices and the positions thereof may differ) are denoted by the same names and signs, and the description thereof will not be given.

Figure 14:
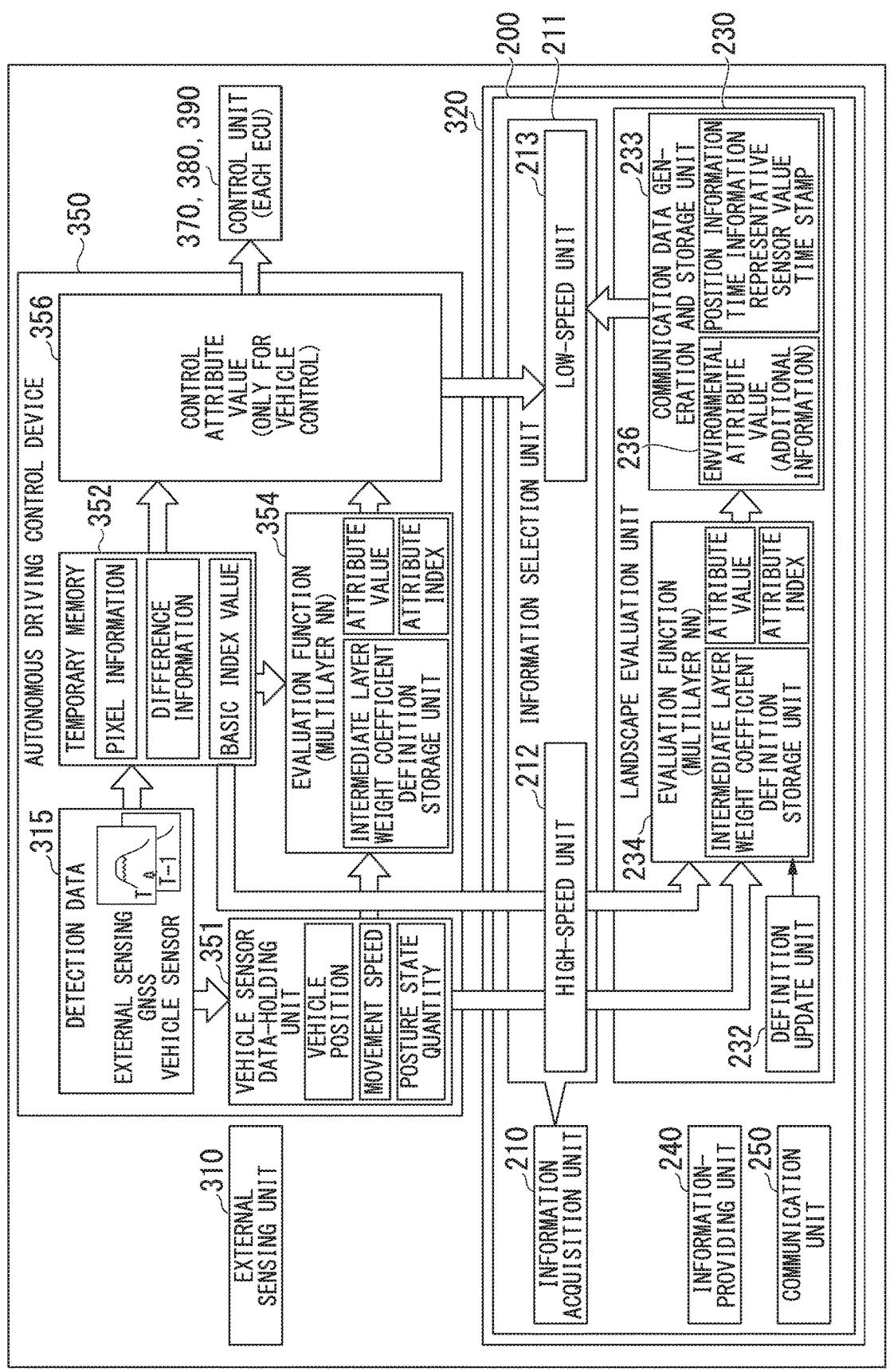
FIG. 14 is a diagram illustrating an example of a configuration of an autonomously driven vehicle 300 according to a modification example.

FIG. 14 is a diagram illustrating an example of a configuration of an autonomously driven vehicle 300 according to a modification example. In the modification example, the information-processing device 200 is mounted in the autonomously driven vehicle 300. The information-processing device 200 is built into or connected outside of, for example, the navigation device 320. The outside connection refers to the information-processing device 200 connected to the navigation device 320 in a wired or wireless manner operating as a portion of the function of the navigation device 320. Meanwhile, the autonomous driving control device 350 of the autonomously driven vehicle 300 (hereinafter also referred to as a host vehicle) is an example of a first evaluation unit, and the information-processing device 200 is an example of a second evaluation unit.

The autonomous driving control device 350 evaluates, for example, attributes of the environment around a vehicle on the basis of detection data 315 detected by the external sensing unit 310, and performs traveling assistance of avoidance control based on autonomous driving on the basis of an evaluation result or traveling assistance of a vehicle for avoiding a collision or an accident based on advanced driver-assistance systems (ADAS) or the like. The detection data 315 includes at least a portion of or the entirety of the content of the detection data 115 (see FIG. 4).

The information-processing device 200 includes the information acquisition unit 210, the landscape evaluation unit 230, the information-providing unit 240, and a communication unit 250. The information-processing device 200 evaluates attributes of the environment around a vehicle on the basis of, for example, the detection data 315 detected by the external sensing unit 310 unlike the evaluation of attributes for traveling assistance of traveling of the vehicle, and assists the determination of a route of the vehicle which is performed by the navigation device 320 on the basis of an evaluation result. Meanwhile, in the modification example, the autonomous driving control device 350 and the information-processing device 200 are an example of a plurality of evaluation units. The autonomous driving control device 350 is an example of the first evaluation unit, and the information-processing device 200 is an example of the second evaluation unit.

First, the evaluation of attributes which is performed by the autonomous driving control device 350 will be described. The autonomous driving control device 350 acquires the detection data 315 (sensor detection information) from the external sensing unit 310. The detection data 315 includes, for example, position data acquired from a GNSS or data acquired from another vehicle sensor in addition to data acquired from the external sensing unit 310.

The autonomous driving control device 350 stores data based on a sensor value such as a vehicle position, a movement speed, or a posture state quantity among the detection data 315 in a vehicle sensor data-holding unit 351, and stores pixel information of captured image data calculated on the basis of the detection data 315, difference information which is information of a difference in a plurality of pieces of detection data, and data such as a basic index value required for the derivation of attribute information in a temporary memory 352. The basic index value is a parameter which is mathematically specified in image processing.

The basic index value in this case may be a parameter which is mathematically specified in image processing without being limited to a value such as "view" as in the above embodiment. The autonomous driving control device 350 determines a control attribute using the detection data 315. The control attribute is data including a combination of an attribute value indicating whether it corresponds to each environment of a vehicle which is typified and an attribute index indicating its degree in the case of corresponding thereto.

FIG. 15 is a diagram illustrating an example of content of data included in a control attribute 355. The control attribute 355 has an attribute value or an attribute index associated with "attributes" obtained by typifying the environment around a vehicle such as, for example, "collision, congestion, a curve, and an object."

The attribute index is, for example, a set of parameters relevant to an attribute among a plurality of parameters obtained on the basis of the detection data 315. For example, regarding the attribute of "curve," parameters relevant to the curve such as "a lane, lane curvature, a steering angle, and acceleration" are extracted from data such as "a position, a vehicle speed, acceleration, a yaw rate, a steering angle, another vehicle, a person, an object, a relative distance, a relative speed, a relative angle, a lane, and a lane curvature" obtained by the detection data 315, and are associated with the attribute index of the curve.

A plurality of parameters are acquired on the basis of, for example, the detection data 315. The detection data includes data recognized within a predetermined distance around a vehicle, data detected in the vehicle, and the like.

The attribute index indicates the degree of an attribute, and is, for example, the magnitude of an attribute index value calculated on the basis of the magnitude of a vector constituted by a plurality of parameters extracted in association with an attribute.

The attribute value is, for example, an evaluation value for determining whether it corresponds to an attribute. The attribute value is represented by, for example, the binary value of 0 or 1 on the basis of results of comparison between an attribute index value and a threshold. For example, the attribute value is associated with 1 in the case of corresponding to an attribute, and is associated with 0 in the case of not corresponding to an attribute.

The autonomous driving control device 350 inputs, for example, data stored in the vehicle sensor data-holding unit 351 and data stored in the temporary memory 352 to an evaluation function 354, and determines whether it corresponds to an attribute on the basis of a calculation result. The evaluation function 354 is constituted by, for example, a multilayer neural network having an intermediate layer.

The multilayer neural network is a multilayered neural network which is used in deep learning. The evaluation function 354 is set by, for example, the execution of deep learning using learning data. The evaluation function 354 is set by learning executed in advance.

The autonomous driving control device 350 inputs, for example, a plurality of images included in the data stored in the temporary memory 352 to the evaluation function 354 in the derivation of the control attribute around a vehicle, and arithmetically operates results of comparison with a feature amount when each pixel of an image is used as an input vector through the multilayer neural network.

In this case, the evaluation function 354 is configured to output relevance to each attribute to a new input vector by a weight of each layer being optimized and a feature amount corresponding to a correct answer attribute being held as a result of learning a large number of input vectors and correct answer attributes at that time as teaching data in advance. For example, the evaluation function 354 can be configured to include a boundary of a shape included in an image, an attribute of an object, and attribute information of the travel environment in attributes, and to include transition from the last time or a state generated next when a plurality of time-series images are input. The autonomous driving control device 350 continuously acquires evaluation values of a vehicle, a road, a pedestrian, an object and a scene attribute for an input image using this evaluation function 354, and recognizes an outside state.

The autonomous driving control device 350 inputs data relating to a vehicle stored in the vehicle sensor data-holding unit 351 to the evaluation function 354, calculates a plurality of parameters including a recognized target, and extracts a plurality of parameters for each attribute. The autonomous driving control device 350 calculates a score (an attribute index value) for each group using the evaluation function 354.

The autonomous driving control device 350 compares the calculated attribute index value with a criterion. The autonomous driving control device 350 determines the criterion adaptability of the attribute index value using a comparison process in which the attribute index value is equal to or greater than a threshold, less than the threshold, within a predetermined range, or the like. In a case where the attribute index value satisfies a criterion, the autonomous driving control device 350 determines that it corresponds to an attribute, and allocates 1 to the attribute value. In a case where the attribute index value does not satisfy the criterion, the autonomous driving control device 350 determines that it does not correspond to an attribute, and allocates 0 to the attribute value.

The autonomous driving control device 350 generates a control attribute on the basis of the content of determined attribute value (see FIG. 15). For example, in a case where the attribute value is 1 and corresponds to an attribute, the autonomous driving control device 350 calculates additional information with respect to this attribute. The additional information will be described later.

The autonomous driving control device 350 generates a control attribute value 356 by adding the additional information to the attribute index value with respect to an attribute having an attribute value of 1. The control attribute value 356 is used in control of traveling assistance of the host vehicle as described later.

Hereinafter, a specific method of calculating an attribute will be described. For example, in a case where the attribute of "collision" is evaluated, the autonomous driving control device 350 calculates collision probability as an attribute index, determines an attribute value on the basis of the magnitude of the calculated collision probability, and determines whether it corresponds to the attribute of collision.

The autonomous driving control device 350 recognizes a moving object around the host vehicle by inputting a plurality of pieces of image data to the evaluation function 354 in, for example, the calculation of the collision probability, and calculates the current positions of an object and the host vehicle. In a case where a plurality of objects are recognized, the autonomous driving control device 350 specifies the type of each object, gives an ID to each object, and calculates the probability of collision between each object and the host vehicle.

The autonomous driving control device 350 inputs data in which "a vehicle speed, acceleration, a yaw rate, a position" and the like are detected and recognized to the evaluation function 354, and performs the future estimation of a positional relationship between the moving object and the host vehicle at a time after a predetermined time defined in advance.

The autonomous driving control device 350 performs deep learning based on the multilayer neural network using the evaluation function 354, executes the future estimation of a positional relationship between the moving object and the host vehicle in accordance with a set estimated time, and calculates the probability of collision between the host vehicle and a nearby object on the basis of an overlapping ratio between a position distribution which is an estimated region where the host vehicle can be located and a position distribution which is a region where the nearby object can be located.

At this time, the autonomous driving control device 350 calculates the probability of collision between the host vehicle and the nearby object by multiplying each binding of the multilayer neural network of the evaluation function 354 by a weight coefficient stored in a storage unit in advance.

In a case where the calculated collision probability and a threshold are compared with each other, and the collision probability does not satisfy a criterion, the autonomous driving control device 350 allocates 0 to the attribute value, and determines that there is no collision. In a case where the collision probability satisfies the criterion, the autonomous driving control device 350 allocates 1 to the attribute value, and determines that there is the possibility of collision.

For example, in a case where the possibility of collision is determined, the autonomous driving control device 350 generates the control attribute value 356 including additional information such as "attribute: collision, collision possibility: present, target: another vehicle (ID=*), and position: (x1, y1)." The autonomous driving control device 350 outputs the control attribute value 356 to the control unit such as the drive force output device 370, the brake device 380, or the steering device 390, and performs control of driving assistance such as avoidance from a target.

Similarly, the above-described autonomous driving control device can also be configured to perform attribute determination and estimate additional information with respect to a plurality of attributes of "preceding vehicle course change," "pedestrian crossing," and "signal state change." For example, the above-described autonomous driving control device 350 determines a control attribute more frequently than the information-processing device 200 to be described later. This is because it is necessary to frequently sense the surrounding environment of the autonomously driven vehicle 300 for assistance of autonomous driving control of the autonomous driving control device 350.

Next, the evaluation of an attribute which is performed by the information-processing device 200 will be described. Here, the process of the index derivation unit 220 according to the above embodiment is assumed to be performed by the landscape evaluation unit 230 instead. The information-processing device 200 evaluates, for example, the attribute of the environment around the host vehicle while the host vehicle is traveling. In the information-processing device 200, the information acquisition unit 210 further includes an information selection unit 211.

The information selection unit 211 includes, for example, two information routes of a high-speed unit 212 which is a bus on a high-speed side for inputting and outputting data at high speed and a low-speed unit 213 which is a bus on a low-speed side to be used in occasional reading.

The high-speed unit 212 is used in, for example, communication having a large data capacity between the autonomous driving control device 350 and the landscape evaluation unit 230. The high-speed unit 212 performs, for example, communication of data acquired by the external sensing unit 310, the GNSS, the vehicle sensor 60, or the like of the autonomously driven vehicle 300.

For example, in a case where sixty images are captured by the external sensing unit 310 during a predetermined time unit (AT), data reduced to about ten images is transmitted to the landscape evaluation unit 230 through the high-speed unit 212. The predetermined time unit is a predetermined time length which is set when a data set is generated as described later.

The data set is not generated in a predetermined time unit, and may be generated by delimiting data of an image by the partition of a predetermined image. The data delimited by the partition of an image may be used in, for example, the calculation of a convolutional neural network.

The low-speed unit 213 is, for example, an information route when the landscape evaluation unit 230 reads out an attribute value generated by the autonomous driving control device 350 at any time. The amount of information which is transmitted to and received from the low-speed unit 213 is smaller than the amount of information which is transmitted to and received from the high-speed unit 212.

The low-speed unit 213 is also used in communication between the autonomously driven vehicle 300 and another device provided outside. The autonomous driving control device 350 outputs, for example, the control attribute value 356 generated at a predetermined timing, as transmission data, to a communication data generation and storage unit 233 (a data generation unit) through the low-speed unit 213. The communication data generation and storage unit 233 transmits, for example, the generated transmission data to an external server 400 through the communication unit 250 connected to the low-speed unit 213.

The landscape evaluation unit 230 includes, for example, a definition update unit 232 and the communication data generation and storage unit 233. The landscape evaluation unit 230 determines an environmental attribute indicating the attribute of the environment for a point that is a target for evaluation using the detection data 315. The environmental attribute is data including an attribute corresponding to each typified environment around a vehicle and an attribute index indicating the degree of the attribute.

FIG. 16 is a diagram illustrating an example of content of data included in an environmental attribute 255. Here, the environmental attribute 255 is generated mainly as a sensitivity index relevant to an occupant's sensitivity. The sensitivity index is a mathematically specified parameter indicating an occupant's sensitivity for the environment of a point that is a target for evaluation such as "view." The sensitivity index is calculated with respect to the attribute of a view, a ride comfort, a congestion status, or the like.

The landscape evaluation unit 230 acquires, for example, information stored in the temporary memory 352 and information stored in the vehicle sensor data-holding unit 351 through the high-speed unit 212 of the information acquisition unit 210, inputs the acquired information to an evaluation function 234, and determines a plurality of environmental attributes for the surrounding environment at a position where the autonomously driven vehicle 300 is traveling while the vehicle is traveling. The evaluation function 234 is constituted by, for example, a multilayer neural network having an intermediate layer. The landscape evaluation unit 230 calculates an attribute index for an attribute using the evaluation function 234. The landscape evaluation unit 230 determines an attribute value on the basis of the calculated attribute index. The landscape evaluation unit 230 evaluates the landscape of the surrounding environment on the basis of the determined attribute value and the magnitude of the attribute index.

In a case where the landscape evaluation unit 230 evaluates, for example, "comfort of a road,", data of a plurality of parameters relevant to the comfort of a road such as acceleration, vibration, sound, congestion, or stop frequency in the detection data 315 is input to the evaluation function 234. The landscape evaluation unit 230 calculates, for example, the attribute index of comfort on the basis of a change pattern of a characteristic parameter of the "comfort of a road" which is learned in the evaluation function 234. The landscape evaluation unit 230 determines whether a point that is a target for evaluation corresponds to the attribute of the "comfort of a road" on the basis of the calculation result of the attribute index.

The landscape evaluation unit 230 determines whether an attribute index value which is calculated on the basis of the magnitude of the attribute index satisfies a criterion, and determines the attribute value of the "comfort of a road." The landscape evaluation unit 230 determines the criterion adaptability of the attribute index value using a comparison process in which the attribute index value is equal to or greater than a threshold, less than the threshold, within a predetermined range, or the like.

Specifically, the landscape evaluation unit 230 compares the magnitudes of vectors of the derived plurality of attribute index values with thresholds applied to respective attributes, calculates attribute values, and calculates a degree at which a point that is a target for evaluation corresponds to a predetermined attribute. The attribute value may be represented by the binary value of 0 or 1 indicating whether it corresponds to an attribute, or may be represented by a gradual numerical value of a binary value or more.

The landscape evaluation unit 230 generates the environmental attribute 255 of a point that is a target for evaluation in accordance with the degree of the attribute value (see FIG. 16). For example, in a case where the attribute value satisfies the criterion and corresponds to an attribute, the landscape evaluation unit 230 generates an environmental attribute value 236 by adding additional information to the attribute index value with respect to this attribute. The landscape evaluation unit 230 generates the environmental attribute value 236 including additional information such as "attribute: comfort of a road, comfort: slight comfort, and position: (x1, y1)." The landscape evaluation unit 230 derives the evaluation value of the sensitivity index at a point that is a target for evaluation in association with a position at which the detection data 315 is acquired on the basis of vehicle information including a plurality of indices and position information. The landscape evaluation unit 230 outputs the generated environmental attribute value 236 to the communication data generation and storage unit 233.

The definition update unit 232 appropriately adds or changes attribute information in which an attribute is defined. The definition update unit 232 adds or changes the attribute information on the basis of, for example, input information accepted by a user's input operation. The user inputs, for example, a category of any attribute desired to be inspected by the user with respect to the environment around a vehicle. The definition update unit 232 updates the definition of an attribute which is used in the evaluation function 234.

The landscape evaluation unit 230 may set an attribute desired to be inspected by the user on the basis of, for example, information which is input to the definition update unit 232 by the user, and derive an evaluation result.

The communication data generation and storage unit 233 selectively generates transmission data transmitted to the outside. The transmission data is transmitted to, for example, the external server 400 to be described later. The communication data generation and storage unit 233 generates one communication data set (transmission data) in a predetermined time unit (AT).

The communication data generation and storage unit 233 associates, for example, the environmental attribute value 236 in a predetermined time unit, position information, time information, a representative value of the detection data 315, and a time stamp including representative information of a time with each other, generates the associated result as a data set of transmission data, and stores the generated result in a storage unit. In this case, the position information may be information of the section of a road specified by nodes and links in map information.

The communication data generation and storage unit 233 transmits the transmission data in a data set unit to the autonomous driving control device 350, the external server 400 to be described later which is provided outside, or the like. However, for example, in a case where the attribute value is not present or the attribute value is less than a threshold, the communication data generation and storage unit 233 does not generate the transmission data. The communication data generation and storage unit 233 selectively generates the transmission data transmitted to the outside on the basis of the content of the calculated attribute value.

The communication data generation and storage unit 233 transmits, for example, data relating to the attribute of the environment around the autonomously driven vehicle 300 sequentially for each predetermined time unit to the autonomous driving control device 350 side through the low-speed unit 213. According to the above-described configuration, the autonomously driven vehicle 300 can evaluate a plurality of indices for the surrounding environment at the coordinates (position) of the vehicle while moving.

The external server 400 having the function of the information-processing device 200 may be further connected to the autonomously driven vehicle 300 in which the above-described information-processing device 200 is mounted through the network NW. The communication data generation and storage unit 233 transmits the transmission data to the external server 400 through the communication unit 250 capable of communication with the outside which is connected to the low-speed unit 213. Using such a process, the autonomously driven vehicle 300 can evaluate the environmental attribute even in an area in which communication conditions are not good.

Figure 17:
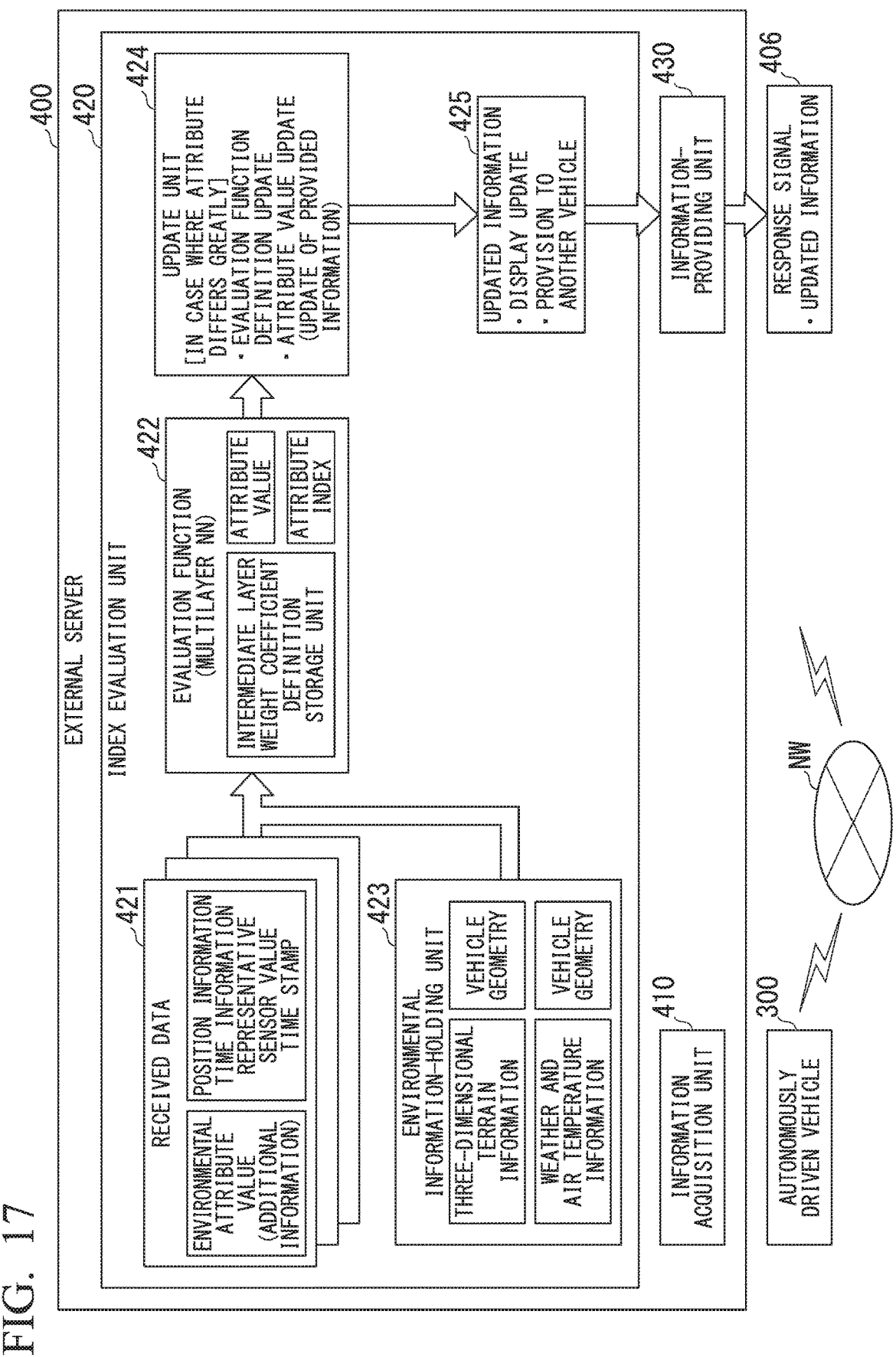
FIG. 17 is a diagram illustrating an example of a configuration of an external server 400.

FIG. 17 is a diagram illustrating an example of a configuration of the external server 400. The external server 400 acquires information relating to the environmental attribute value from the autonomously driven vehicle 300, re-evaluates the environmental attribute by adding fluctuating information, and provides an evaluation result to the autonomously driven vehicle 300.

For example, since the environmental attribute value of "view" or the like fluctuates depending on the construction of a building, the weather, the air temperature, the shape of a vehicle, or the like, the external server 400 acquires information relating to the environment from a vehicle which is traveling in the spot in reality, re-evaluates the environmental attribute by adding information such as the weather, the air temperature or the like, and also provides information to the autonomously driven vehicle 300 or another vehicle.

The external server 400 includes an information acquisition unit 410, an environment evaluation unit 420, and an information-providing unit 430. The environment evaluation unit 420 includes an evaluation function 422, an environmental information-holding unit 423, and an update unit 424 that adds derived attribute information.

The environmental information-holding unit 423 stores vehicle geometry information including three-dimensional terrain information of a region which is a target for evaluation, weather and air temperature information, or information such as the dimensions of a plurality of vehicles. The above information is temporal information that can be changed over time, and the environment evaluation unit 420 acquires the temporal information through the network NW at a predetermined timing, and updates the temporal information in a case where there is a change.

The environment evaluation unit 420 acquires the transmission data transmitted by the communication data generation and storage unit 233 as received data 421 through the information acquisition unit 410. The environment evaluation unit 420 inputs the temporal information stored in the environmental information-holding unit 423 to the evaluation function 422 in addition to the received data 421, and derives the environmental attribute value of the environment around the vehicle.

For example, a multilayer neural network is used in the evaluation function 422. The environment evaluation unit 420 calculates, for example, the environmental attribute in accordance with a difference in a terrain, weather and air temperature, the dimensions of the vehicle, or the like.

For example, in the evaluation of the attribute of "view," in a case where the weather of a point with a good view is rainy or cloudy, or the view becomes poor depending on a seating position in a vehicle, whereby the environmental attribute value acquired from the autonomously driven vehicle 300 indicates that "a view is poor," the environment evaluation unit 420 changes the environmental attribute value of the "view" of a current point that is a target for evaluation using the evaluation function 422. The evaluation function 422 increases a weight coefficient for a parameter in an arithmetic operation of a multilayer neural network in accordance with an environment change of an environment, a viewpoint position or the like such as a change in the weather or a change of a seating position of a vehicle.

In a case where the derived environmental attribute value of a point that is a target for evaluation becomes greatly different from the environmental attribute value of the received data, the update unit 424 updates the definition of the evaluation function 422, and adds the derived environmental attribute value as a new environmental attribute value. The update unit 424 generates update information 405 including the updated environmental attribute value. The update unit 424 transmits the update information 405 to the autonomously driven vehicle 300.

The update unit 424 provides information to another autonomously driven vehicle. The update unit 424 transmits a response signal 406 through the information-providing unit 430. The response signal 406 is, for example, information including the update information 405 derived in the external server 400 on the basis of the transmission data.

In this manner, the autonomously driven vehicle 300 transmits the transmission data through the communication unit 250, and thus can receive the response signal 406, sent back with respect to the transmission data from the external server 400, through the information acquisition unit 210.

In the autonomously driven vehicle 300, in a case where the response signal 406 is received, the information-providing unit 240 provides the autonomously driven vehicle 300 with the landscape information indicating information relating to the landscape around the autonomously driven vehicle 300 on the basis of any of attribute information determined on the autonomously driven vehicle 300 side and added attribute information included in the response signal 406 acquired from an external server.

Thereby, the autonomously driven vehicle 300 can also use the attribute information updated in the external server 400 in addition to the attribute information determined in the autonomously driven vehicle 300. The external server 400 can provide the shape of a vehicle or environmental attributes according to a change in the environment over time such as a future change in the weather. According to the information-processing device 200, it is possible to perform assistance of traveling control of autonomous driving of the autonomously driven vehicle 300 more reliably.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims. For example, the index derivation unit 220 and the landscape evaluation unit 230 of the information-processing device 200 may be provided on the vehicle 100 side.

What is claimed is:

1. An information-processing device, comprising:
an acquisition unit that acquires sensor detection information indicating a detection result from a sensor mounted in a vehicle;
a derivation unit that derives a plurality of indices for a surrounding environment based on the sensor detection information acquired by the acquisition unit; and
an evaluation unit that evaluates attribute information of a point at which the sensor detection information is acquired based on the plurality of indices derived by the derivation unit.

2. The information-processing device according to claim 1,
wherein the evaluation unit derives an evaluation value of a sensitivity index at the point in association with a position at which the sensor detection information is acquired based on the plurality of indices and vehicle information including position information.

3. The information-processing device according to claim 2,
wherein the evaluation unit derives the evaluation value of the sensitivity index in association with a time included in a unit of a predetermined time length.

4. The information-processing device according to claim 2, further comprising
an information-providing unit that provides the vehicle with information relating to a landscape based on the evaluation value.

5. The information-processing device according to claim 4,
wherein the information-providing unit provides the vehicle with the information relating to the landscape in accordance with relevance between a category of good views selected by an occupant of the vehicle and the attribute information.

6. The information-processing device according to claim 1,
wherein the vehicle is an autonomously driven vehicle, and
the vehicle performs at least one of a lane change or a change of a distance relationship with another vehicle so as to improve evaluation performed by the evaluation unit of how good a view is.

7. An information-processing method causing a computer to:
acquire sensor detection information indicating a detection result from a sensor mounted in a vehicle;
derive a plurality of indices for a surrounding environment based on the acquired sensor detection information; and
evaluate attribute information of a point at which the sensor detection information is acquired based on the plurality of indices which are derived.

8. A program causing a computer to:
acquire sensor detection information indicating a detection result from a sensor mounted in a vehicle;
derive a plurality of indices for a surrounding environment based on the acquired sensor detection information; and
evaluate attribute information of a point at which the sensor detection information is acquired based on the plurality of indices which are derived.

9. The information-processing device according to claim 1,
wherein the derivation unit derives a plurality of indices indicating an attribute of a surrounding environment on the vehicle by inputting the sensor detection information acquired by the acquisition unit to a plurality of the evaluation units defined beforehand in accordance with a purpose used in control, and
the plurality of evaluation units include a first evaluation unit that determines a control attribute reflected in control content of the vehicle using the sensor detection information and a second evaluation unit that determines an environmental attribute indicating an attribute of an environment for the point using the sensor detection information.

10. The information-processing device according to claim 9,
wherein the first evaluation unit determines the control attribute more frequently than the second evaluation unit.

11. The information-processing device according to claim 9, further comprising
an update unit that updates a definition of the evaluation unit, the update unit being able to add the attribute information which is output from the evaluation unit.

12. The information-processing device according to claim 4, further comprising
a data generation unit that associates the sensor detection information and the plurality of indices with the position information, and selectively generates transmission data which is transmitted to an outside in accordance with content of the plurality of indices.

13. The information-processing device according to claim 12, further comprising
a communication unit that receives a response signal sent back with respect to the transmission data transmitted to the outside,
wherein the information-providing unit provides landscape information indicating information relating to a landscape around the vehicle based on any of the attribute information determined by the vehicle and updated attribute information included in the response signal.

14. An information-processing device, comprising:
an acquisition unit that acquires sensor detection information indicating a detection result from a sensor mounted in a vehicle through communication;
a derivation unit that derives a plurality of indices for a surrounding environment of the vehicle based on the sensor detection information acquired by the acquisition unit;
an evaluation unit that evaluates attribute information of a point at which the sensor detection information is acquired based on a plurality of indices derived by the derivation unit and attribute information acquired from the vehicle; and
an information-providing unit that transmits a result of the evaluation evaluated by the evaluation unit to the vehicle.

* * * * *